(12) United States Patent
Loreno

(10) Patent No.: US 6,638,435 B2
(45) Date of Patent: Oct. 28, 2003

(54) METHOD FOR DRAINING A BARGE OR OTHER LIKE CONTAINER

(75) Inventor: Terry Ross Loreno, Livonia, LA (US)

(73) Assignee: Louisiana Marine Systems, Inc., Livonia, LA (US)

( * ) Notice: Subject to any disclaimer, the term of this patent is extended or adjusted under 35 U.S.C. 154(b) by 48 days.

(21) Appl. No.: 09/907,726

(22) Filed: Jul. 17, 2001

(65) Prior Publication Data

US 2002/0020678 A1 Feb. 21, 2002

Related U.S. Application Data

(63) Continuation-in-part of application No. 09/641,962, filed on Aug. 21, 2000, now abandoned.

(51) Int. Cl.[7] .............................................. B01D 35/02
(52) U.S. Cl. ..................... 210/767; 210/117; 210/172; 210/242.1; 210/342; 210/416.1; 210/461; 210/462
(58) Field of Search ................................ 210/117, 136, 210/153, 155, 162, 242.1, 315, 316, 335, 337, 338, 342, 416.1, 458, 459, 460, 461, 462, 489, 498, 499, 767, 800, 289, 172; 417/435; 114/26, 27, 183 R

(56) References Cited

U.S. PATENT DOCUMENTS

| | | | | |
|---|---|---|---|---|
| 705,364 A | * | 7/1902 | Kurtz ........................ 210/315 |
| 1,129,322 A | * | 2/1915 | West ........................... 114/26 |
| 1,150,981 A | * | 8/1915 | Walter ......................... 114/26 |
| 1,169,792 A | * | 2/1916 | French ....................... 210/315 |
| 1,761,504 A | * | 6/1930 | Todd .......................... 417/435 |
| 3,206,036 A | * | 9/1965 | Hawley ...................... 210/460 |
| 3,920,268 A | * | 11/1975 | Stewing ....................... 285/21 |
| 4,089,284 A | * | 5/1978 | Matsuno et al. .............. 114/26 |
| 4,851,118 A | * | 7/1989 | Kurihara ..................... 210/315 |
| 5,496,468 A | * | 3/1996 | Cormier ..................... 210/172 |
| 6,036,850 A | * | 3/2000 | Reynolds .................... 210/117 |

\* cited by examiner

Primary Examiner—Matthew O. Savage
(74) Attorney, Agent, or Firm—Roy, Kiesel, Keegan and DeNicola

(57) ABSTRACT

A disposable extended sump line having a pump end and a mouth end for removing water from a barge or other container. The mouth end has a double layered strainer basket covering its entrance. The pump end preferably has a valve which may be opened to introduce water into the sump line from above. The pump end of the line is also configured to connect to a pump, so that suction may be applied. The double layered strainer basket will keep the cargo away from the mouth end of the sump line and prevent clogging. By adding water to the sump line through the valve, the sump line may be primed quickly. Finally, by making the sump line from disposable materials, the problems of damage to the sump line during unloading may be overcome by simply discarding the sump line and replacing it with another before reloading.

5 Claims, 3 Drawing Sheets

METHOD FOR DRAINING A BARGE OR OTHER LIKE CONTAINER

This is a continuation-in-part of U.S. patent application Ser. No., 09/641,962, filed on Aug. 21, 2000, now abandoned, and which is hereby incorporated by reference in its entirety

BACKGROUND OF THE INVENTION

1. Field of the Invention

The invention relates to pumps and drainage systems in general and to barge drainage systems in particular.

2. Prior Art

Barges are frequently uncovered, particularly those carrying petroleum coke, coal or other similar materials. As such, they often become partially filled with water from rain and from the moisture content of the cargo. Water accumulation can easily total 100 to 150 net tons in open barges traveling the lower Mississippi River. In the most extreme cases, this can actually lead to the sinking of a barge. However, in less extreme situations, water in the barge can still create significant difficulties. The water in the barge can cause the barge to ride lower in the water, making it more difficult to control and increasing the risk that the barge will collide with structures in the waterway, such as bridges and piers. Additionally, a barge riding lower in the water is more likely to run aground as the vessel passes through relatively shallow waters. Where a barge is fully laden prior to taking on water, the added weight of the water may cause the barge to be so overladen, that she is unable to leave the dock until the water is removed. Thus, time may be lost and demurrage charges incurred as the bargemen attempt to remove the water from the barge.

Finally, the presence of standing water at the bottom of the barge prevents all of the cargo from being removed. Cargo such as coal or coke cannot be separated from the water with conventional unloading such as a front end loader. If the cargo is scooped out with the water, it creates a general mess on the conveyor belts that are frequently used to transport such cargos away from the dock. Cleaning such conditions can be expensive, in view of the many environmental laws regulating what can be discharged into waterways. Thus, the portion of a cargo such as coal or coke that has water standing on it is typically not unloaded from the barge.

Obviously, the inability to fully unload a barge can represent significant losses to the cargo owner. However, it also represents downtime for the barge. The water and excess cargo must be removed from the barge and the barge cleaned before it is used again, especially if the barge is to be used to carry a different cargo. Thus, the barge must be taken to a dockyard where it can be cleaned, typically with manual labor, at a substantial expense to the cargo owner.

Some barges are equipped with a sump pump with dedicated lines for pumping out the barge. However, many problems arise with these sump systems. Quite frequently, especially with coke, the sumps become clogged, and they cannot be used to pump the water out of the barge. Also, the pump lines may become stopped up or they may be damaged, such that the barge, which may be perfectly functional except for the damaged sump or sump lines, must be decommissioned for repairs if she is to be able to ship water.

Other barges are provided with a pump that has a permanent intake line that runs from a mouth at the bottom of the barge to a pump at the top. The distance between the mouth and the pump can often be fifteen or twenty feet. This distance, in itself, can cause problems in these pumps in that they often take some time to prime. Also, like the sump systems, the mouth ends tend to become clogged, particularly when the barge is laden with coke. Another problem that arises with these lines is that they are easily damaged. The point of the pumps are to remove water that has filtered down through the cargo and come to rest in the bottom of the barge. Thus, the intake line must run down through the cargo. This is accomplished by simply loading the barge over the intake line. Typically, the loading process does not excessively damage the lines. However, the presence of the cargo prevents the lines from being removed, and unloading the barges is where most of the damage is done to the pump lines. Barges carrying coal, coke and other similar cargoes are usually unloaded with cranes, front end loaders, or other powerful hydraulic machinery. While the intake lines will often be aluminum or steel, they typically cannot hold up to the crushing forces exerted by a front end loader shoving several tons of coke or other cargo against the line. Thus, the lines will often be rendered unusable after only one or two loadings and unloadings of the barge. Therefore, a pump system for a barge or other similar container meeting the following objectives is desired.

OBJECTS OF THE INVENTION

It is an object of the invention to remove water from a barge or other similar container.

It is another object of the invention to remove water from a barge fully laden.

It is still another object of the invention to remove water from a barge laden with coke.

It is yet another object of the invention to provide an intake line to a pump that is not likely to become clogged, even when dealing with a coke cargo.

It is yet another object of the invention to provide an intake line to a pump that may be loaded over.

It is still another object of the invention to provide an intake line that may be quickly primed.

It is another object of the invention to provide an intake line that may be easily discarded after a single use.

SUMMARY OF THE INVENTION

The invention comprises a disposable extended sump line for removing water from a barge. The sump line has a pump end and a mouth end. The mouth end has a double layered strainer basket covering its entrance. The pump end of the line preferably has a valve which may be opened to allow water to be introduced into the sump line from above. The pump end of the line is also configured to connect to a pump, so that suction may be applied to the sump line. The double layered strainer basket will keep the cargo away from the mouth end of the sump line and prevent it from becoming clogged. By adding water to the sump line through the valve, the sump line may be primed quickly. Finally, by making the sump line from disposable materials, the problems of damage to the sump line during unloading may be overcome by simply discarding the sump line and replacing it with another before the barge is loaded again.

DETAILED DESCRIPTION OF THE INVENTION

Figures 1, 2, 5:
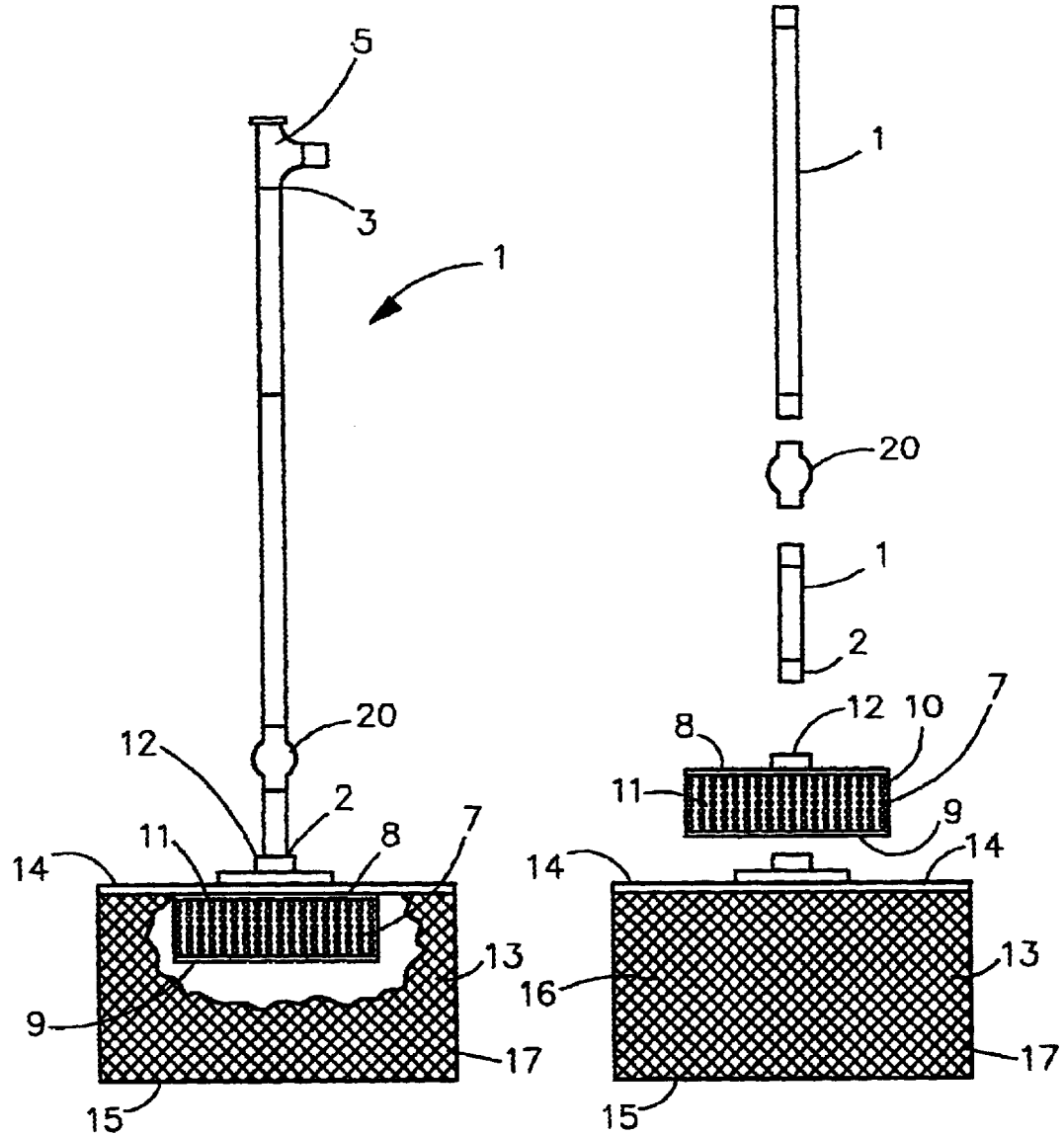
FIG. 1 is an exploded side view of a preferred embodiment of a sump line.
FIG. 2 is a partial cut-away side view of a preferred embodiment of a sump line.
FIG. 5 is a cut-away side view of a check valve.
Figure 3:
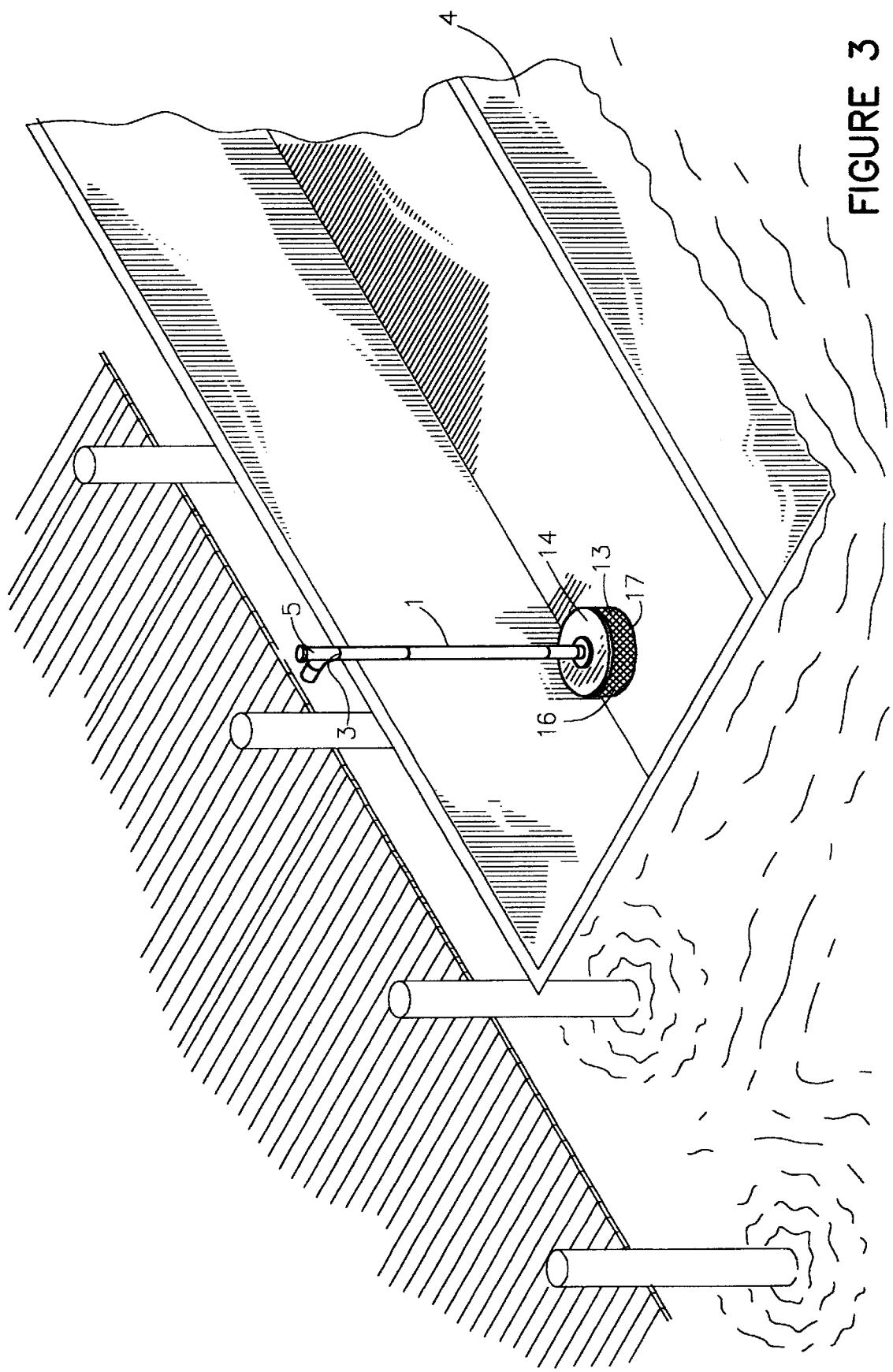
FIG. 3 is a perspective view of a preferred embodiment of a sump line in place in a barge before loading.
Figure 4:
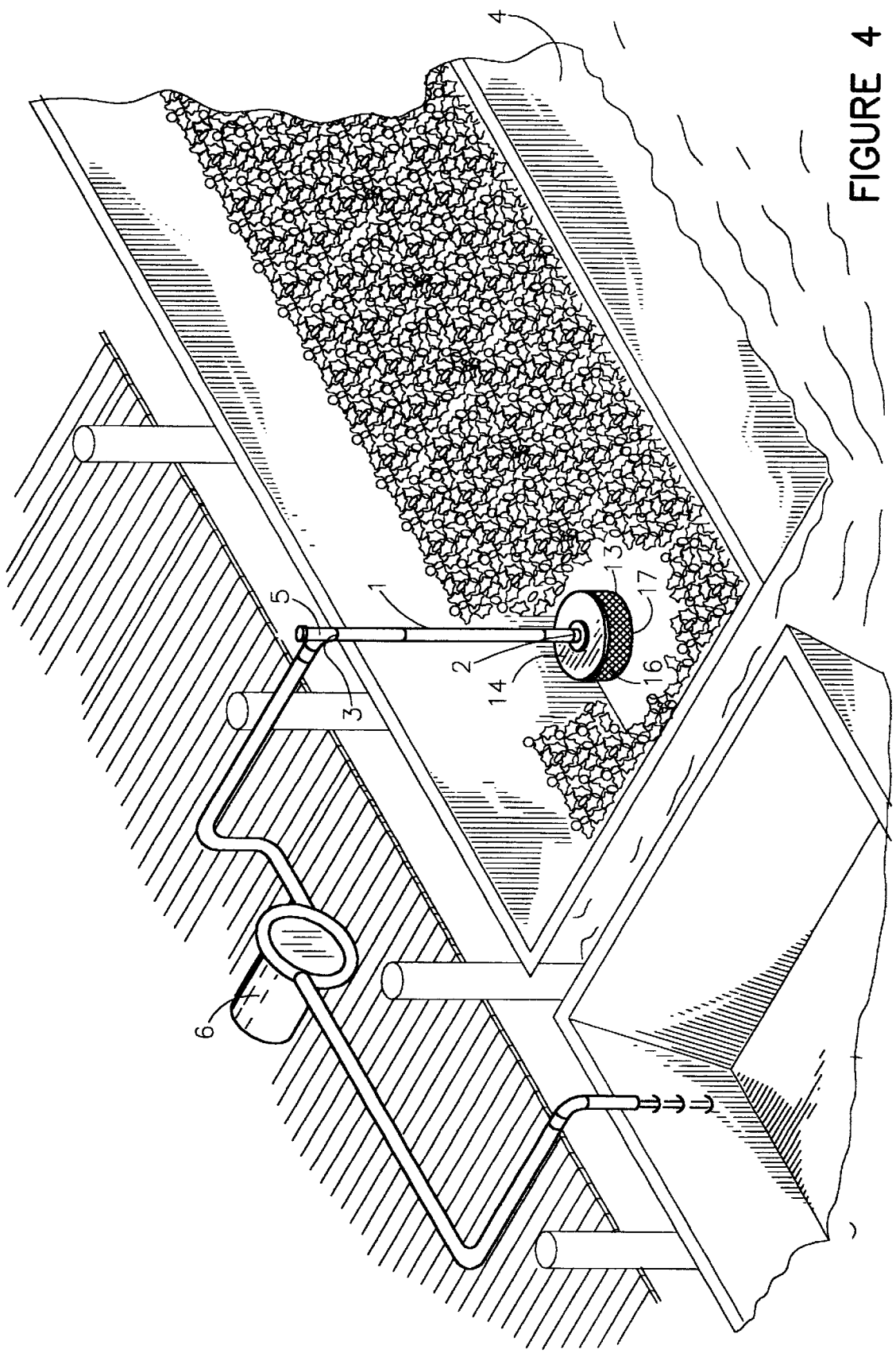
FIG. 4 is a perspective view of a preferred embodiment of a sump line in place in a barge after loading and during dewatering.

The invention comprises a disposable sump line 1. Sump line 1 has a mouth end 2 and a pump end 3. Sump line 1 is preferably about fourteen to fifteen feet long, although the length may vary depending upon the depth of barge 4 or other container which sump line 1 is being used to drain. Sump line 1 is preferably made of polyvinylchloride (PVC) pipe, although other conventional plastics or metals may be used. Sump line 1 may be all of one piece or made of several sections. In the most preferred embodiment, sump line 1 is made of several sections of PVC pipe which will allow the length of sump line 1 to be adjusted according to the depth of barge 4 or other container. The pipe in sump line 1 may be of any diameter, but the inventor's preferred size for use in pumping barge 4 is two inch internal diameter pipe.

Pump end 3 of sump line 1 should preferably contain a priming valve 5. Priming valve 5 may be opened to allow sump line 1 to be filled from the top. This will expedite priming of sump line 1 substantially, a significant concern with lines on the order of fifteen feet. By quickly priming sump line 1, the total time needed to pump barge 4 or other vessel can be substantially reduced.

Mouth end 2 of sump line 1 should preferably contain a check valve 20. The preferred embodiment of check valve 20 has a hinged flap 21 positioned inside check valve 20 that only allows water to flow through check 20 in one direction. Check valve 20 should be positioned in sump line 1 near mouth end 2 and configured to only allow fluid to flow through sump line 1 in the direction from mouth end 2 toward pump end 3. Thus, when priming valve 5 is opened and water is added to sump line 1 from pump end 3, it will fill sump line 1 above check valve 20 rather than simply running out mouth end 2 of sump line 1. This will facilitate priming sump line 1. The preferred embodiment of check valve 20 manufactured by Flo Control, Inc. of Burbank, Calif. and can be purchased at many plumbing warehouses such as LCR Plumbing Warehouse at 6232 Siegen Lane; Baton Rouge, La.

Pump end 3 of sump line 1 should be connected to a pump 6. Pump 6 will apply suction to sump line 1. Pump 6 may be any conventional type of pump; however, the inventor prefers a gasoline or electric powered five horsepower two inch pump, such as the Hidels Pump, manufactured by Koshin, Ltd. of 12 Kani-Hachnotsubo, Kotari; Nagaokakyo City, Kyoto, Japan and which is available for purchase in the United States at many locations including Lastor Distributors at 7724 South Commerce Avenue; Baton Rouge, La. Although the above mentioned pump is preferred, it should be noted that any conventional pump capable of lifting water the length of sump line 1 will work.

While pump 6 may be connected directly to sump line 1, it will frequently be preferable to place pump 6 on a dock or other structure that is slightly removed from barge 4 or other vessel being pumped. Thus, it will frequently be necessary to connect pump 6 with sump line 1. For this purpose, sump line 1 is preferably provide with a ninety degree elbow at pump end 3. A separate hose, pipe, or sections of pipe can then connect pump 6 to sump line 1.

Mouth end 2 of sump line 1 should be provided with a first strainer basket 7. First strainer basket is preferably cylindrical and preferably about six inches in diameter and about four inches in height. In the preferred embodiment, it has a top 8 a bottom 9 opposite top 8 and sidewalls 10 extending between top 8 and bottom 9. First strainer basket 7 preferably contains a plurality of apertures 11 in sidewalls 10, bottom 9, and/or top 8. Apertures 11 are preferably round and preferably have a diameter of about ¼ of an inch. In the preferred embodiment, there are 248 apertures 11 in first strainer basket 7. First strainer basket 7 is also provided with a mouth opening 12. First strainer basket 7 is positioned so that mouth opening 12 communicates with mouth end 2 of sump line 1, whereby fluid that is inside first strainer basket 7 may enter sump line 1 through mouth opening 12 and mouth end 2. First strainer 7 is preferably made of a rigid polyethylene plastic, although other plastics or metals such as aluminum or stainless steel may be used if desired.

The preferred polyethylene strainers 7 can be obtained commercially from the McMaster Carr Company located at 6100 Fulton Industrial Boulevard; Atlanta, Ga.

Positioned around first strainer 7 is a second strainer 13. Second strainer basket 13 is also preferably cylindrical and preferably about eighteen inches in diameter and about one foot in height. Second strainer basket 13 also has a top 14 and a bottom 15 and sidewalls 16 extending between top 14 and bottom 15. Second strainer basket 13 encompasses first strainer basket 7 so that fluid must pass through second strainer basket 13 to reach first strainer basket 7. This is facilitated by sidewalls 16 and bottom 15, which in the preferred embodiment are made of aluminum mesh wire having a plurality of openings 17, each of about 1 square inch.

In the preferred embodiment, second strainer basket 13 is positioned around and attached to sump line 1 slightly above where first strainer basket 7 attaches to mouth end 2. Alternatively, second strainer basket 13 may be placed so that top 14 of second strainer basket 13 is contiguous with top 8 of first strainer basket 7. In this configuration, tops 8 and 14 may be of a single piece if desired. In the preferred embodiment, top 14 of second strainer basket 13 is made of ¹⁄₁₀₀ₜₕ of an inch thick sheet metal in order to protect second strainer basket 13 and first strainer basket 7. By positioning second strainer basket 13 around first strainer basket 7, the cargo may be kept away from first strainer basket 7 and more importantly from mouth end 2. This will prevent first strainer basket 7 and mouth end 2 from becoming clogged.

In operation, sump line 1 is preferably placed in barge 4 or other vessel before it is loaded. The cargo is then loaded atop sump line 1, and any rain that falls during the voyage will simply collect in barge 4. When barge 4 is ready to be unloaded, sump line 1 is connected to pump 6, and suction applied to sump line 1. Priming valve 5 should be opened and sump line 1 filled with a hose or other water source in order to prime sump line 1 and pump 6. When sump line 1 and pump 6 are primed, water will begin to flow out of barge 4 through sump line 1. The water may be discharged through pump 1 into the water body or into a vessel where the discharged water can be retained until it can be treated, if needed. Together, second strainer basket 13 and first strainer basket 7 will prevent the cargo from clogging sump line 1.

Additionally, the design allows larger particles to fall out of the water before reaching mouth end 2 of sump line 1. The larger cargo particles will be held back by openings 17 in second strainer basket 13. These large particles adjacent the aluminum mesh of second strainer basket 13 will act as a filter, and will prevent smaller cargo particles from reaching first strainer basket 7. However, of those cargo particles that do pass through second strainer basket 13, may of them will be too large to pass through apertures 11 of first strainer basket 7. These intermediate cargo particles will collect outside first strainer basket 7 and will likewise act as a filter. Thus, the water discharged from pump 6 will have been effectively twice filtered and is surprisingly clear and clean.

When the cargo is unloaded from barge 4 or other vessel, the heavy equipment is likely to damage sump line 1 or first or second strainer baskets 7, 13. However, by making sump line out of lightweight and inexpensive material such as PVC pipe and aluminum, it is easy and affordable for a dock worker to simply remove and discard the used sump line 1 and to replace it with another sump line 1 before barge 4 is reloaded. The easy removal and replacement of sump line 1 is enhanced by the fact that the preferred embodiment weighs only seventeen pounds, with both strainer baskets, 7 and 13.

Although the invention is described in the context of removing water from a barge, it is anticipated that the invention may be used with any pumpable fluid and any conventional container or vessel which is likely to need to be pumped. It is anticipated that these and other uses and embodiments will be obvious to those skilled in the art and are intended to be covered by the scope of the following claims.

I claim:

1. A method for removing fluid from a vessel comprising:
   a) placing a sump line in a substantially empty vessel, said sump line comprising:
   a line having a pump end and a mouth end, said pump end configured to operatively engage a pump;
   a first strainer basket positioned at said mouth end, said first strainer basket having a top, a bottom opposite said top, sidewalls extending between said top and said bottom, and a plurality of apertures in said first strainer basket, said first strainer basket configured to require fluid to pass through said first strainer basket to enter said mouth end of said line; and
   a second strainer basket enclosing said first strainer basket, said second strainer basket having a top, a bottom, sidewalls extending between said top and said bottom, and a plurality of openings in said second strainer basket that are larger than the apertures in said first strainer basket, said second strainer basket configured to require fluid to pass through said second strainer basket to enter said first strainer basket, and wherein said second strainer basket is separate from walls of said vessel;
   b) loading said vessel with a solid cargo, directly over said first basket of said sump line;
   c) allowing said vessel to at least partially fill with fluid;
   d) connecting said pump end of said line to a pump;
   e) operating said pump to remove said fluid from said vessel through said sump line.

2. A method for removing fluid from a vessel according to claim 1 wherein said sump line further comprises a valve at the mouth end of said line, said valve having an open position and a closed position, said valve being configured to allow fluid to be added to said line when said valve is in said open position and wherein said sump line further comprises a check valve positioned proximate to said mouth end of said sump line, said check valve configured to only allow fluid to flow through said sump line in the direction from said mouth end toward said pump end.

3. A method for removing fluid from a vessel according to claim 2 further comprising opening said valve and adding fluid to said sump line, whereby said pump may be quickly primed.

4. A method for removing fluid from a vessel according to claim 1 wherein said vessel has a hold defined by a bottom with sidewalls extending from said bottom and wherein said second strainer basket is positioned adjacent to one of said sidewalls.

5. A method for removing fluid from a vessel according to claim 4 wherein said sump line is detachably placed in said vessel.

* * * * *